SPHERICAL ABERRATION AND SINUSOIDAL CONDITION

ASTIGMATISM f=80 f=126.4 f=200

CHROMATIC ABERRATION
OF
MAGNIFICATION (g - line)

DISTORTION 3,615,125
COMPACT TELEPHOTO TYPE ZOOM LENS
Takashi Higuchi, Yokohama-shi, and Soichi Nakamura, Tokyo, Japan, assignors to Nippon Kogaku K.K., Tokyo, Japan
Filed June 26, 1968, Ser. No. 740,168
Claims priority, application Japan, July 4, 1967, 42/42,564
Int. Cl. G02b 15/14
U.S. Cl. 350—184
2 Claims

ABSTRACT OF THE DISCLOSURE

A compact telephoto zoom lens is provided comprising a zooming system composed of three groups of converging, diverging and converging lenses from the side of the object, and a relay lens system connected to said zooming system. The relay lens system is composed of two groups, a front group and a rear group, which is characterized by carrying out the conversion of the main focal length by moving the second group of the zooming system axially, and correcting the deviation of the image caused by said movement by the movement of the third group.

---

Figure 1:
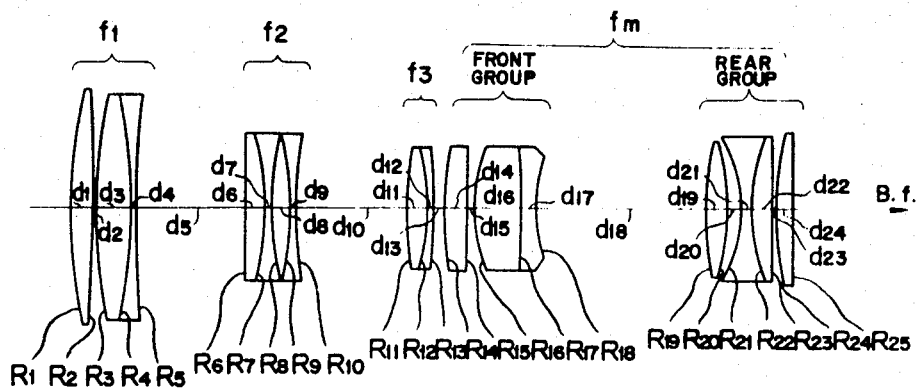
Figure 2:
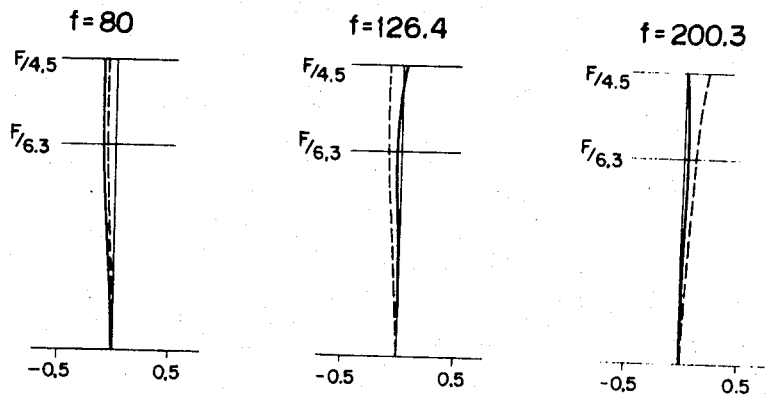
Figure 3:
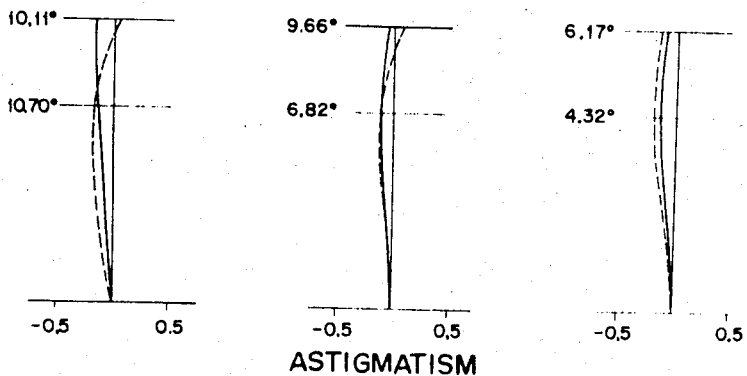
Figure 4:
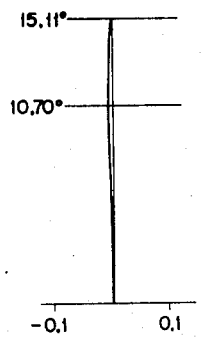
Figure 4:
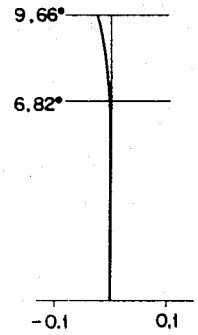
Figure 4:
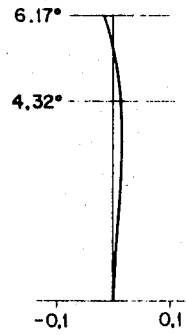
Figure 5:
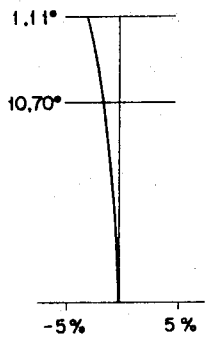
Figure 5:
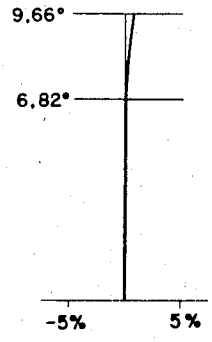
Figure 5:
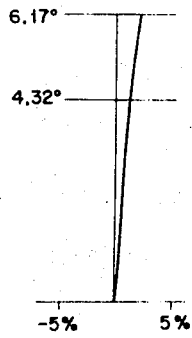

This invention relates to a compact telephoto type zoom lens comprising a zooming system composed of three groups of converging, diverging and converging lenses from the side of the object, and a relay lens system composed of two groups, a front group and a rear group, connected to said zooming system, which is characterized by carrying out the conversion of the main focal length by moving the second group of the zooming system, the movement of an image position caused by the deviation of the second group of the zooming system being corrected by the movement of the third group of the zooming system, providing a converging lens composed of positive and negative lenses cemented to each other behind the single positive lens in the first group, providing a diverging lens composed of positive and negative lenses cemented to each other and a single negative lens behind said diverging lens in the second group, providing a single positive lens or a compound converging lens composed of positive and negative lenses cemented to each other depending on the degree of achromatism to be desired in the third group, having the front group of the relay lens system composed of at least two groups of three lenses, and having the rear group composed of four lenses in at least three converging, diverging and converging groups.

The object of this invention is to provide a telephoto type zoom lens having excellent performance throughout the whole zooming range while making the whole system compact, wherein the zooming system is composed of three groups of converging, diverging and converging lenses, and the third group is moved in such a manner that the position of an image can be kept constant when the second group is moved axially.

In planning a telephoto zoom lens for a still camera, it is required that the whole system should be made as compact and light as possible. It is an indispensible factor to minimize the zooming system in order to make the whole system compact. Generally speaking, when the zooming system is made smaller, an increase of the aberrations results so that correction of astigmatism and chromatic aberration of spherical aberration requires a high technique for correction.

As the relay lens which can overcome the increase of the astigmatism caused by the zooming system, and has less spherical aberration, a system of Petzval type can be thought about, but when such a system as Petzval system is adopted it is apt to increase the whole length of the system when compared with the focal length; and when such a system as Petzval system is used as the relay lens system, it is not appropriate in view of the condition that the whole system should be made compact. As to the compact relay lens, it is preferable to make the telephoto ratio as small as possible, and at the same time having the function to eliminate astigmatism and all other abberation.

In accordance with this invention, it is possible to provide a compact relay lens in which astigmatism and spherical aberration caused by zooming system can be excellently corrected.

In accordance with this invention, when the maximum focal length of the whole system is set to be "$fl$," and the whole length including the back focus is set to be "D," such a relation as "$D<fl$" can be attained and it is possible to obtain a very compact and light weight telephoto zoom lens having high performance wherein aberrations are excellently corrected. This invention can be applied not only to still cameras, but may also be used for zoom lens for printers, cine-cameras, or zoom lens for projectors, extending the usefulness of zoom lens.

In accordance with this invention, a telephoto zoom lens system is provided comprising a zooming system composed of three groups of converging, diverging, and converging lenses in seriatim from the object side, and a relay lens system connected to said zooming system composed of the two groups of lenses. In the first group, a converging lens prepared by cementing positive and negative lenses is provided behind a single positive lens, and in the second group a diverging lens prepared by cementing alternate positive and negative lenses is provided before a single negative lens. A third group is provided composed of a single positive lens, or a compound converging lens prepared by cementing positive and negative lenses depending on the degree of the achromatism to be desired. The relay lens which is connected to said third group, is composed of two lens groups, i.e., a front group composed of at least two groups comprising three lenses, and a rear group composed of four lenses in at least three groups each group in its respective order being converging, diverging and converging.

When the focal length of the first group is set to be $f_1$, and the focal length of the second group is set to be $f_2$, and the radius of curvature of the first surface of the second group is set to be $R_6$, and the focal length of the front group of the relay lens is set to be $fm_1$, and the refractive indexes of the positive lens and the negative lens of the converging cemented lens of the front group of the relay lens are respectively set to be $n_1$ and $n_2$, and the focal length of the whole relay lens is set to be $fm$, and the radii of curvature of the front surface and the rear surface of the last positive lens are respectively set to be $R_a$ and $R_b$, the following conditions must be satisfied.

(a) $0.8\ fm<fm_1<1.1\ fm$            (1)
(b) $0.49>n_2-n_1>0.1$ $R_6>0$ and $10\ |f_2|<R_6<\infty$            (2)

$|R_a|<|R_b|$            (3)

$0.7<f_1/fm<1.8$            (4)

The Formula 1 shows the basic condition for reducing astigmatism and spherical aberration caused by the zooming system while keeping the relay lens system very compact.

In the Formula (a) of the Formulae 1, when "$fm_1$" becomes larger than "$1.1\ fm$," the whole length of the relay lens system becomes too long, and as a result, the whole length "D" of the whole system becomes larger than the maximum focal length "$fl$" which departs from the spirit of this invention. When it becomes smaller than 0.8 fm, the relay lens itself becomes a lens having a very small telephoto ratio, and the correction of aberration becomes very difficult and impractical.

In the Formula (b) of (1), when $n_2-n_1$ becomes smaller than 0.1, the correction of astigmatism is still difficult, even if the Formula (a) of (1) should be satisfied. Only when the conditions of (a) and (b) are satisfied simultaneously minimum aberration correction can be excepted.

The upper limit of the Formula (b) is close to the limit of the difference of the refractive index of the conventional optical glass. It is impossible to obtain the difference of refractive index above that from the conventional optical glass, and a deterioration of spherical aberration results.

The condition represented by the Formula 2 prevents the distortion on the shorter focal length from becoming negative. At the same time, it is a condition for keeping the balance of the image on both ends of the zooming zone. In other words, when $R_6$ becomes $\infty$ or negative, the distortion becomes too much in the negative on the shorter focal length side, and the difference between the same and the distortion of the longer focal length side becomes too great. On the other hand, when $R_6$ becomes smaller than $10 |f_2|$ the distortion on the side of the shorter focal length can be prevented from becoming negative, but it becomes difficult to keep the balance of the images on the side of shorter focal length and longer focal length. Therefore, $R_6$ must be within the range defined by the Formula 2.

The Formula 3 represents the condition for overcoming the positive distortion which is caused when the front group of the relay lens is required to be bent in the convex direction toward the surface of an object in order to retain the flatness of the image when the relay lens is required to cover more than 20° of the total angle of view. In other words, it is possible to easily correct the distortion by means of the condition of Formula 3 without disturbing the balance of the other aberrations.

The Formula 4 shows the basic relation between the zooming system and the relay lens, and when $f_1/fm$ becomes smaller than 0.7, the zooming system becomes too small, and the correction of aberration becomes too difficult and impractical. On the other hand, when $f_1/fm$ is larger than 1.8, the correction of aberrations can be easily carried out. However, the size of the whole system becomes too large, and it is not practical in view of the still camera which especially requires operationability.

As is apparent from the above explanations, when the conditions represented by the Formulae 1 to 4 are satisfied, the whole length "D" becomes smaller than the maximum focal length "fl," and this it is possible to realize a compact telephoto zoom lens having high performance.

This invention will be described more clearly referring to the illustrative embodiments shown in the attached drawing, in which:

FIG. 1 is a cross sectional view of a zoom lens for still camera according to this invention; and FIGS. 2 through 5 are graphs of aberrations at the minimum, intermediate, and maximum focal length of the embodiment shown in FIG. 1.

The following examples correspond to the embodiment illustrated in FIG. 1.

In the following examples, $r_1, r_2 \ldots r_{25}$ are the radii of curvature of the respective lenses, and $d_1, d_2 \ldots d_{24}$ are the central thickness of the respective lenses and the air-spaces, and $n_1, n_2 \ldots n_{15}$ are the refractive indexes on line $d$ of the respective glass materials, and $v_1, v_2 \ldots v_{15}$ show the Abbé numbers of the glass materials.

EXAMPLE 1

$[f=80\sim200.3 \quad F/4.5 \quad$ Whole length$=195.31$, the maximum focal length$=200.3]$

| | | | | | |
|---|---|---|---|---|---|
| | | $r_1=123.951$ | $d_1=5.0$ | $n_1=1.62041$ | $v_1=60.3$ |
| | | $r_2=-381.170$ | $d_2=0.1$ | | |
| $f_1=121.0$ | | $r_3=135.630$ | $d_3=7.3$ | $n_2=1.61375$ | $v_2=56.3$ |
| | | $r_4=-156.000$ | $d_4=2.0$ | $n_3=1.75520$ | $v_3=27.5$ |
| | | $r_5=357.629$ | $d_5=1.33\sim39.58$ | | |
| | | $r_6=10000.000$ | $d_6=3.7$ | $n_4=1.68893$ | $v_4=31.1$ |
| | | $r_7=-44.550$ | $d_7=1.0$ | $n_5=1.51728$ | $v_5=69.6$ |
| $f_2=-40.3$ | | $r_8=49.824$ | $d_8=4.4$ | | |
| | | $r_9=-45.250$ | $d_9=1.2$ | $n_6=1.62041$ | $v_6=60.3$ |
| | | $r_{10}=149.585$ | $d_{10}=39.40\sim1.04$ | | |
| | | $r_{11}=121.500$ | $d_{11}=4.0$ | $n_7=1.62041$ | $v_7=60.3$ |
| $f_3=108.3$ | | $r_{12}=-51.315$ | $d_{12}=1.0$ | $n_8=1.62004$ | $v_8=36.3$ |
| | | $r_{13}=-148.009$ | $d_{13}=10.88\sim10.99$ | | |
| | | $r_{14}=80.803$ | $d_{14}=4.7$ | $n_9=1.54814$ | $v_9=45.9$ |
| | | $r_{15}=-1347.294$ | $d_{15}=0.7$ | | |
| | $fm_1=117.8$ | $r_{16}=32.600$ | $d_{16}=10.4$ | $n_{10}=1.53172$ | $v_{10}=48.9$ |
| | | $r_{17}=-222.200$ | $d_{17}=2.8$ | $n_{11}=1.78470$ | $v_{11}=26.1$ |
| | | $r_{18}=44.818$ | $d_{18}=38.1$ | | |
| | | $r_{19}=103.461$ | $d_{19}=3.8$ | $n_{12}=1.51680$ | $v_{12}=64.2$ |
| $fm=113.1$ | | $r_{20}=-63.360$ | $d_{20}=3.0$ | | |
| | | $r_{21}=-31.220$ | $d_{21}=1.5$ | $n_{13}=1.74400$ | $v_{13}=44.9$ |
| | | $r_{22}=40.000$ | $d_{22}=4.9$ | $n_{14}=1.69895$ | $v_{14}=30.0$ |
| | | $r_{23}=\infty$ | $d_{23}=0.1$ | | |
| | | $r_{24}=62.328$ | $d_{24}=4.0$ | $n_{15}=1.70154$ | $v_{15}=41.1$ |
| | | $r_{25}=-2085.243$ | | | |
| | | B.f$=40.0$ | | | |

EXAMPLE 2

[$f=80.2\sim201.2$   F/5.6   Whole length$=182.02$, the maximum focal length$=201.2$]

| | | | | | |
|---|---|---|---|---|---|
| $f_1=97.5$ | | $r_1=99.826$ | $d_1=4.01$ | $n_1=1.62041$ | $v_1=60.3$ |
| | | $r_2=-307.266$ | $d_2=0.08$ | | |
| | | $r_3=109.370$ | $d_3=5.93$ | $n_2=1.61375$ | $v_2=56.3$ |
| | | $r_4=-125.814$ | $d_4=1.60$ | $n_3=1.75520$ | $v_3=27.5$ |
| | | $r_5=288.150$ | $d_5=0.87\sim31.68$ | | |
| | | $r_6=815.033$ | $d_6=3.01$ | $n_4=1.68893$ | $v_4=31.1$ |
| $f_2=-32.5$ | | $r_7=-35.890$ | $d_7=0.80$ | $n_5=1.51728$ | $v_5=69.6$ |
| | | $r_8=40.129$ | $d_8=3.51$ | | |
| | | $r_9=-36.473$ | $d_9=1.00$ | $n_6=1.62041$ | $v_6=60.3$ |
| | | $r_{10}=103.308$ | $d_{10}=31.81\sim0.82$ | | |
| $f_3=87.2$ | | $r_{11}=82.459$ | $d_{11}=4.01$ | $n_7=1.51680$ | $v_7=64.2$ |
| | | $r_{12}=-97.968$ | $d_{12}=8.69\sim8.87$ | | |
| | | $r_{13}=81.005$ | $d_{13}=4.73$ | $n_8=1.54814$ | $v_8=45.9$ |
| | $fm_1=122.24$ | $r_{14}=-1350.662$ | $d_{14}=0.72$ | | |
| | | $r_{15}=34.195$ | $d_{15}=10.43$ | $n_9=1.54771$ | $v_9=62.9$ |
| | | $r_{16}=-100.438$ | $d_{16}=2.81$ | $n_{10}=1.78470$ | $v_{10}=26.1$ |
| | | $r_{17}=48.875$ | $d_{17}=37.69$ | | |
| $fm=113.2$ | | $r_{18}=103.719$ | $d_{18}=3.81$ | $n_{11}=1.51118$ | $v_{11}=50.9$ |
| | | $r_{19}=-63.518$ | $d_{19}=3.01$ | | |
| | | $r_{20}=-29.514$ | $d_{20}=1.52$ | $n_{12}=1.74400$ | $v_{12}=44.9$ |
| | | $r_{21}=42.105$ | $d_{21}=4.89$ | $n_{13}=1.69895$ | $v_{13}=30.0$ |
| | | $r_{22}=\infty$ | $d_{22}=0.08$ | | |
| | | $r_{23}=62.484$ | $d_{23}=4.01$ | $n_{14}=1.70154$ | $v_{14}=41.1$ |
| | | $r_{24}=-275.045$ | B.f$=43.00$ | | |

According to the present invention, a high quality zoom lens is obtained which is very compact and excellently corrected. The zoom lens of this invention may be used not only for still cameras but also for cine cameras and for printers, which extends the use of zoom lenses.

What is claimed is:

1. Telephoto zoom lens comprising a zooming system composed of three groups of converging, diverging and converging lenses in seriatim from the object side, and a relay lens system connected to said zooming system composed of two groups of lenses, a front group and a rear group, which is characterized by carrying out the conversion of the main focal length by moving the second group of the zooming system axially and correcting the movement of the image position caused by the movement of the second group of the zooming system with movement of the third group; the first group including a converging lens prepared by cementing positive and negative lenses and disposed behind a single positive lens, the second group including a diverging lens prepared by cementing positive and negative lenses with a single negative lens behind said diverging lens, the third group including a compound converging lens prepared by cementing positive and negative lenses; the front group of the relay lens system including at least two groups of three lenses in which one group is formed by cemented positive and negative lenses and the rear relay group includes four lenses in at least three converging, diverging and converging groups; and having the following numerical values wherein $f$ subscript designates the focal lengths of the respective lens groups, $r$ subscript the radii of curvature of the respective lenses, $d$ subscript the central thicknesses and air spaces, $n$ subscript the refractive indices, and $v$ subscript the Abbé numbers:

[$f=80\sim200.3$   F/4.5   Whole length$=195.31$, the maximum focal length$=200.3$]

| | | | | | |
|---|---|---|---|---|---|
| $f_1=121.0$ | | $r_1=12.951$ | $d_1=5.0$ | $n_1=1.62041$ | $v_1=60.3$ |
| | | $r_2=-381.170$ | $d_2=0.1$ | | |
| | | $r_3=135.630$ | $d_3=7.3$ | $n_2=1.61375$ | $v_2=56.3$ |
| | | $r_4=-156.000$ | $d_4=2.0$ | $n_3=1.75520$ | $v_3=27.5$ |
| | | $r_5=357.269$ | $d_5=1.33\sim39.58$ | | |
| | | $r_6=10000.000$ | $d_6=3.7$ | $n_4=1.68893$ | $v_4=31.1$ |
| | | $r_7=-44.550$ | $d_7=1.0$ | $n_5=1.51728$ | $v_5=69.6$ |
| $f_2=-40.3$ | | $r_8=49.824$ | $d_8=4.4$ | | |
| | | $r_9=-45.250$ | $d_9=1.2$ | $n_6=1.62041$ | $v_6=60.3$ |
| | | $r_{10}=149.585$ | $d_{10}=39.40\sim1.04$ | | |
| | | $r_{11}=121.500$ | $d_{11}=4.0$ | $n_7=1.62041$ | $v_7=60.3$ |
| $f_3=108.3$ | | $r_{12}=-51.315$ | $d_{12}=1.0$ | $n_8=1.62004$ | $v_8=36.3$ |
| | | $r_{13}=-148.009$ | $d_{13}=10.88\sim10.99$ | | |

[$f=80\sim200.3$    F/4.5    Whole length=195.31, the maximum focal length=200.3]—Cont.

| | | | | | |
|---|---|---|---|---|---|
| $fm=113.1$ | $fm_1=117.8$ | $r_{14}=80.803$ | $d_{14}=4.7$ | $n_9=1.54814$ | $v_9=45.9$ |
| | | $r_{15}=-1347.204$ | $d_{15}=0.7$ | | |
| | | $r_{16}=32.600$ | $d_{16}=10.4$ | $n_{10}=1.53172$ | $v_{10}=48.9$ |
| | | $r_{17}=-222.200$ | $d_{17}=2.8$ | $n_{11}=1.78470$ | $v_{11}=26.1$ |
| | | $r_{18}=44.818$ | $d_{18}=38.1$ | | |
| | | $r_{19}=103.461$ | $d_{19}=3.8$ | $n_{12}=1.51680$ | $v_{12}=64.2$ |
| | | $r_{20}=-63.360$ | $d_{20}=3.0$ | | |
| | | $r_{21}=-31.220$ | $d_{21}=1.5$ | $n_{13}=1.74400$ | $v_{13}=44.9$ |
| | | $r_{22}=40.000$ | $d_{22}=4.9$ | $n_{14}=1.69895$ | $v_{14}=30.0$ |
| | | $r_{23}=\infty$ | $d_{23}=0.1$ | | |
| | | $r_{24}=62.328$ | $d_{24}=4.0$ | $n_{15}=1.70154$ | $v_{15}=41.1$ |
| | | $r_{25}=-2085.243$ | B.f=40.0 | | |

2. Telephoto zoom lens comprising a zooming system composed of three groups of converging, diverging and converging lenses in seriatim from the object side, and a relay lens system connected to said zooming system composed of two groups of lenses, a front group and rear group, which is characterized by carrying out the conversion of the main focal length by moving the second group of the zooming system axially and correcting the movement of the image position caused by the movement of the second group of the zooming system with movement of the third group; the first group including a converging lens prepared by cementing positive and negative lenses and disposed behind a single positive lens, a second group including a diverging lens prepared by cementing positive and negative lenses with a single negative lens behind said diverging lens, the third group including a single positive lens; the front group of the relay lens system including at least two groups of three lenses in which one group is formed by cemented positive and negative lenses and the rear relay group includes four lenses in at least three converging, diverging and converging groups; and having the following numerical values wherein $f$ subscript designates the focal lengths of the respective lens groups, $r$ subscript the radii of curvature of the respective lenses, $d$ subscript the central thicknesses and air spaces, $n$ subscript the refractive indices, and $v$ subscript the Abbé numbers:

[$f=80.2\sim201.2$    F/5.6    Whole length=182.02, the maximum focal length=201.2]

| | | | | | |
|---|---|---|---|---|---|
| $f_1=97.5$ | | $r_1=99.826$ | $d_1=4.01$ | $n_1=1.62041$ | $v_1=60.3$ |
| | | $r_2=-307.266$ | $d_2=0.08$ | | |
| | | $r_3=109.370$ | $d_3=5.93$ | $n_2=1.61375$ | $v_2=56.3$ |
| | | $r_4=-125.814$ | $d_4=1.60$ | $n_3=1.75520$ | $v_3=27.5$ |
| | | $r_5=288.150$ | $d_5=0.87\sim33.68$ | | |
| $f_2=-32.5$ | | $r_6=815.033$ | $d_6=3.01$ | $n_4=1.68893$ | $v_4=31.1$ |
| | | $r_7=-35.890$ | $d_7=0.80$ | $n_5=1.51728$ | $v_5=69.6$ |
| | | $r_8=40.129$ | $d_8=3.51$ | | |
| | | $r_9=-36.473$ | $d_9=1.00$ | $n_6=1.62041$ | $v_6=60.3$ |
| | | $r_{10}=103.308$ | $d_{10}=33.81\sim0.82$ | | |
| $f_3=87.2$ | | $r_{11}=82.459$ | $d_{11}=4.01$ | $n_7=1.51680$ | $v_7=64.2$ |
| | | $r_{12}=-97.968$ | $d_{12}=8.60\sim8.87$ | | |
| | $fm_1=122.24$ | $r_{13}=81.005$ | $d_{13}=4.73$ | $n_8=1.54814$ | $v_8=45.9$ |
| | | $r_{14}=-1350.662$ | $d_{14}=0.72$ | | |
| | | $r_{15}=34.195$ | $d_{15}=10.43$ | $n_9=1.54771$ | $v_9=62.9$ |
| | | $r_{16}=-100.438$ | $d_{16}=2.81$ | $n_{10}=1.78470$ | $v_{10}=26.1$ |
| | | $r_{17}=48.875$ | $d_{17}=37.69$ | | |
| $fm=113.2$ | | $r_{18}=103.719$ | $d_{18}=3.81$ | $n_{11}=1.51118$ | $v_{11}=50.9$ |
| | | $r_{19}=-63.518$ | $d_{19}=3.01$ | | |
| | | $r_{20}=-29.514$ | $d_{20}=1.52$ | $n_{12}=1.74400$ | $v_{12}=44.9$ |
| | | $r_{21}=42.105$ | $d_{21}=4.89$ | $n_{13}=1.69895$ | $v_{13}=30.0$ |
| | | $r_{22}=\infty$ | $d_{22}=0.08$ | | |
| | | $r_{23}=62.484$ | $d_{23}=4.01$ | $n_{14}=1.70154$ | $v_{14}=41.1$ |
| | | $r_{24}=-275.045$ | B.f=43.00 | | |

References Cited

UNITED STATES PATENTS 2,937,572    5/1960    Yamaji _____ 350—184
3,336,094    8/1967    Macher _____ 350—184

JOHN K. CORBIN, Primary Examiner

U.S. Cl. X.R.

350—214